March 18, 1958 R. N. RHODES 2,827,513

DELTA CONNECTED COLOR TELEVISION DEMODULATOR

Filed July 30, 1954

INVENTOR.
Roland N. Rhodes
BY [signature]
ATTORNEY

United States Patent Office 2,827,513

Patented Mar. 18, 1958

2,827,513

DELTA CONNECTED COLOR TELEVISION DEMODULATOR

Roland N. Rhodes, Levittown, Pa., assignor to Radio Corporation of America, a corporation of Delaware Application July 30, 1954, Serial No. 446,806

16 Claims. (Cl. 178—5.4)

The present invention relates to matrix and demodulating circuits, and more particularly to matrix and demodulating circuits of the type employed in color television receivers.

Color images may be transferred electrically by analyzing the light from an object into not only its image elements, as is accomplished by normal scanning procedure, but also by analyzing the light from elemental areas of the image into the selected primary or component colors and thereby deriving therefrom a signal representative of each of the selected color components. A color image may then be reproduced at a remote point by appropriate reconstruction from a component color signal train.

The method proposed for transmitting a color television picture is one based on a set of standards which were authorized by the Federal Communications Commission on December 17, 1953. These standards describe a composite color television signal which contains both the chrominance information or monochrome information relating to the scene and also a color modulated subcarrier which contains modulations representative of color-difference or chrominance signals. In the color television receiver synchronous demodulator circuits are provided to demodulate from the color modulated subcarrier matrix circuits a desired set of color-difference signals which, when combined with the monochrome information, yield the recovered component color signals.

The present invention is a simplified demodulating and matrix means which accomplishes this purpose in a novel and direct fashion.

In order to best appreciate the present invention, consider in more detail the precise nature of the composite color television signal which conforms to the FCC standards. Three primary colors, red, green, and blue are utilized for a description of the color in the image to be transmitted. These three primary colors do not appear equally bright because they are located in different parts of the spectrum and hence stimulate the brightness sensation of the eye by different amounts. However, if the three primary colors are mixed in the right proportions, it is found that the green primary, which is located at the center of the visible spectrum, accounts for 59% of the brightness sensation while the blue and red primaries account for 11% and 30% respectively. Thus utilizing a color television signal or Y signal according to the equation $$Y=0.30R+0.59G+0.11B \quad (1)$$

a monochrome signal may be produced; this monochrome signal is generated in accordance with the existing scanning standards; i. e. 525 lines, 60 fields per second and 30 frames per second and is treated exactly like a standard monochrome signal with respect to bandwidth and the addition of synchronizing and blanking pulses.

In order to produce color pictures from the signal transmitted to a color receiver, it is necessary to produce at least two other independent color signals since color involves three independent variables. These color signals are designated as R–Y, G–Y, and B–Y and indicate, as previously described, how each color in the televised scene differs from the Y signal.

These color-difference signals may be written in the following way to constitute a set of three independent signals:

$$R-Y=0.70R-0.59G-0.11B \quad (2)$$

$$G-Y=-.30R+0.41G-0.11B \quad (3)$$

$$B-Y=0.30R-0.59G+0.89B \quad (4)$$

where Y is described by Equation 1. These equations cannot be solved for R, G, and B in terms of R–Y, G–Y, and B–Y, but they may be solved to yield any single chrominance signal in terms of the other two; for example $$G-Y=-0.51(R-Y)-0.19(B-Y) \quad (5)$$

The chrominance or color-difference information is transmitted in the color modulated subcarrier which contains not only the signals described by Equations 2, 3, and 4, but also a continuous change of hue as a function of angle in the quadrature modulated color subcarrier. The processes of recovering one of more of the color-difference signals utilizes the principles of synchronous detection wherein a locally generated signal in the receiver having the frequency of the color subcarrier but a particular phase relating to the particular color-difference signal being detected, is heterodyned with the color modulated subcarrier to produce the desired color-difference signal. If a multiplicity of color-difference signals are required, then a series of heterodyning signals must be provided, each accurately phased with respect to the corresponding color-difference signal demodulated.

In order to make the employment of the process of synchronous detection possible, synchronizing means are provided which utilize a color synchronizing burst which is transmitted on the back porch of the horizontal synchronizing pulse. This color synchronizing burst has the frequency, 3.58 mc. of the color subcarrier, and is phased with respect to the color-difference signals in a manner whereby, for example, the phase of color synchronizing burst leads the phase of the R–Y signal by 90°, the phase of the R–Y signal leading the phase of the B–Y signal by 90° and the phase of the G–Y signal by 214.3°.

If a multiplicity of color-difference signals are required, then multiple processes of synchronous detection may be utilized to provide these signals. The present invention provides simplified demodulator and matrix means which which yield a trio of required color-difference signals from a modulated color subcarrier in a manner involving not only new and novel concepts, but also simplification of circuitry, D.-C. coupling, directness of approach and ease in adjustment.

In many types of envelope sampling systems which are employed for synchronous detection the amplitude of the synchronous detection signal must be approximately ten times larger than the amplitude of the color modulated subcarrier if maximum phase error, for example, is to be less than 5° and if the output D.-C. level is to be relatively independent of the carrier amplitude. It is then often expedient to utilize what are known as balanced synchronous detector circuits which are operated in such a way that the envelope is sampled in a plurality of paths in a manner which reduces the necessary ratio of amplitude of the synchronous detection signal to the amplitude of the modulated subcarrier signal. Balanced diode synchronous detector circuits, for example, often use at least a pair of diode synchronous detector circuits for each of the color-difference signals involved; in many applications, then, if two color difference signals are to be synchronously detected, at least four diodes or rectifiers are required. In such a circuit, the third color difference signal may be formed by proper combination of the first two color difference signals as is indicated by Equation 5. If three balanced diode synchronous detector circuits are utilized it may be necessary to use a minimum of six diodes or rectifiers. The present invention is a balanced diode synchronous detector circuit which utilizes only three rectifiers which are included in a delta arrangement which has the advantage in that the amplitude of the synchronous detection signal need be only approximately twice as large as the amplitude of the color modulated subcarrier signal with the circuit operating in full balance and necessitating only the use of a phase splitter which will supply synchronous detection signals at each of three phases which are related to a corresponding color difference signal.

It is therefore an object of this invention to provide a simplified balanced synchronous detector for use in a color television receiver.

It is still another object of this invention to provide a synchronous detector circuit which may be utilized for the synchronous detection of three color difference signals and which will operate to provide balanced operation and D.-C. coupling.

It is yet another object of this invention to provide a simplified diode demodulator circuit which may be utilized for demodulation of at least three signals included in a phase demodulated subcarrier; it is yet another object of this invention to provide a delta diode demodulated circuit which provides balanced synchronous demodulation of a trio of color difference signals in a color television receiver and wherein the delta diode demodulator circuit utilizes only a trio of rectifier circuits.

According to the invention, three diodes or rectifiers are arranged in a delta configuration. Each of the diodes is connected in combination with a biasing decay circuit and a transformer device which provides a means for introducing the modulated subcarrier into each leg of the delta. By impressing properly phased synchronous detection signals at each apex of the delta circuit, utilizing phases which correspond to the color difference signals being demodulated, the synchronous detection signal is caused to flow around the perimeter of the delta diode demodulated circuit to influence, together with the color modulated subcarrier, the conduction intervals of the diodes. This action creates pulses and sets up back bias to which the modulated color subcarrier adds to and subtracts, thereby balancing the circuit and causing proper phase and amplitude synchronous detections at input circuits provided at the apexes of the delta diode demodulator.

In another form of the invention, the synchronous detection subcarrier signal is inserted simultaneously into each of the transformers which are included in the various legs of the delta configuration and three phases of the color subcarrier are impressed at the apexes or corners of the delta configuration.

Other and incidental objects of this invention will become apparent by a reading of the following specifications and an inspection of the accompanying drawings in which.

Figures 1, 2:
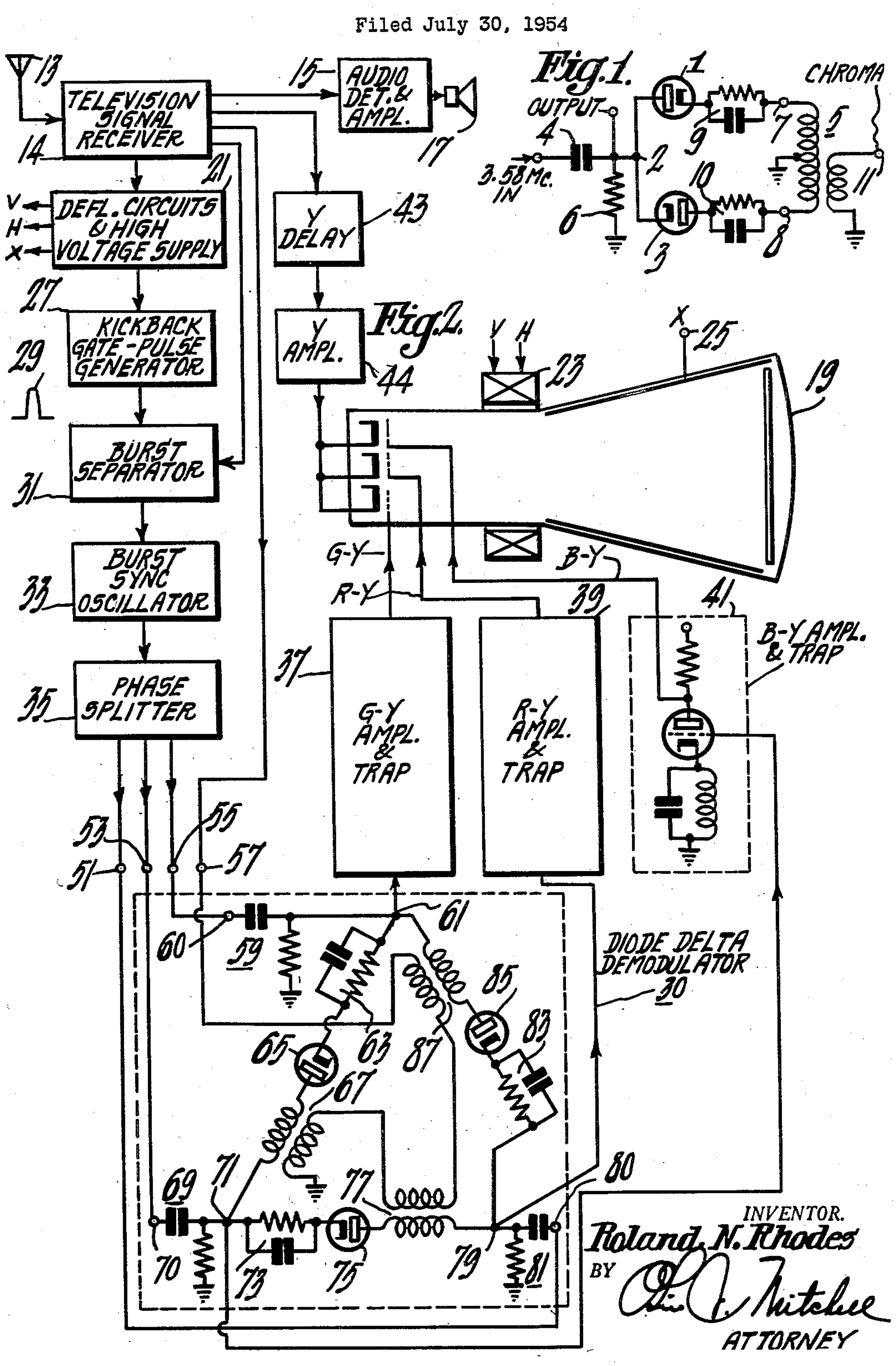
Figure 1 shows the circuit diagram of a balanced two-path diode demodulator circuit.
Figure 2 shows the block diagram of a color television receiver including a schematic diagram of the diode delta demodulator 30 one form of embodiment of the present invention.

Consider first the operation of a balanced two-path diode demodulator circuit. Many aspects of the behaviour of the circuit are useful for a more complete understanding of the embodiment of the present invention which is to be described.

In the circuit shown in Figure 1, the 3.58 mc. color subcarrier signal is applied to the terminal 2 through the condenser 4, which is coupled to ground by the resistor 6. This 3.58 mc. signal is then applied simultaneously to the anode of diode 1 and the cathode of diode 3. At the same time, the chroma or color information which is contained on a color modulated subcarrier is applied to the input terminal 11 which, due to the transformer action performed in the transformer 5, causes the chroma to appear at transformer terminal 7 in one phase and to appear at transformer terminal 8 in a phase 180° out of phase with respect to the chroma appearing at transformer terminal 7. The diodes 1 and 3 will conduct simultaneously though they are unbalanced with respect to the 3.58 mc. signal. Current is therefore caused to flow in the loop made up of the diodes 1 and 3, the resistance-condenser or decay networks 9 and 10, and the transformer secondary of transformer 5 to perform the functions of envelope sampling at the phase prescribed by the particular phase of the 3.58 mc. signal being applied. The envelope information at this particular phase, which corresponds to the color difference signal related to this phase, then causes a difference in charge to occur across the condenser 4. This difference in charge represents the color difference signal information which then appears at the output terminal 13. The decay networks 9 and 10 are employed for establishing biases which are a function of the conducting intervals of the diode so that proper selection of the phase of envelope sampling as dictated by the 3.58 mc. signal is achieved.

Consider now the block diagram of the color television receiver shown in Figure 2. Here the incoming signal arrives at the antenna 13 and is applied to the television signal receiver 14. The television signal receiver 14 provides a demodulated color television signal including the sound information, which is transmitted on a sound carrier 4½ mcs. removed from the picture carrier. The television signal receiver 14 includes the functions of first detection, intermediate frequency amplification, second detection and automatic gain control. Many of these functions are described in chaper 22 of the book "Harmonics, Sidebands and Transients in Communication Engineering," by C. Louis Cuccia, published by the McGraw-Hill Book Co. in 1952.

The sound information is then recovered by using, for example, an intercarrier sound circuit in the audio detector and amplifier 15; the recovered information is then applied to the loud speaker 17.

The color television signal information relating to the image is accommmodated in at least four channels of the color television receiver, these channels being adapted to produce the recovered color signals which are applied to the color kinescope 19.

One channel from the television signal receiver applies the picture synchronizing signals to the deflection circuits and high voltage supply 21 which delivers deflecton signals to the yokes 23, in addition to a high voltage signal to the ultor 25. Another function of the deflection circuits and high voltage supply 21 is to activate the kickback gate pulse generator 27. The kickback gate pulse generator 27 is usually a winding which is included on the high voltage supply transformer; it has the function of providing a gating pulse 29 during the horizontal blanking period.

Another channel from the television signal receiver 14 impresses the color television signal on the burst separator 31 upon which is also impressed the kickback pulse 29. The kickback pulse is timed whereby it opens a burst gate during the duration interval of the color synchronizing burst thereby causing burst separation. The separated burst is then fed by the burst separator 31 to the burst synchronized oscillator 33 which, utilizing the separated burst and the kickback pulse 29 produces a local oscillator signal which is accurately synchronized with the phase and frequency of the color synchronizing burst.

Another channel from the television signal receiver 13 applies the color television signal or the chroma to the diode delta demodulator 30. At the same time, the burst synchronized oscillator 33 delivers a synchronized signal to the phase shifter 35 which yields three synchronous detection signals of proper individual phases to the terminals 55, 53, and 51 of the diode delta demodulator 30 thereby leading to the synchronous detection of a predetermined group of color-difference signals. These color-difference signals may be G–Y, R–Y, and B–Y signals, or any group of signals which may be suitable for eventual reconstruction of color image information.

The fourth channel from the television signal receiver is the Y or luminance channel. The Y signal information is passed through the Y delay line 43 and the Y amplifier 44 and applied simultaneously to the cathodes of the color kinescope 19.

Consider now the details of operation of the diode delta demodulator 30 which forms one embodiment of the present invention; this diode delta demodulator 30 is shown in detailed schematic form in Figure 2. It is seen that the circuit elements are arranged in delta form having apex terminals 61, 71 and 79. Between each of the apexes is installed a series circuit made up of a decay or resistance-condenser network, a diode and a chroma transformer. At each of the apexes, the phase splitter 35 produces a properly phased signal from the burst sync oscillator 33; this signal is impressed on the apex terminal by use of a resistance condenser network. The chroma, as applied to input terminal 57, is applied simultaneously to the secondary of the transformers 87, 77 and 67. The phases of the signals applied by the phase shifter to the apex terminals 61, 79 and 71 are either at the G–Y, R–Y and B–Y phases, or bear predetermined phase relationships to these phases which enhance the operation of the circuit.

Operationally, the diode delta demodulator 30 functions in a manner whereby the phases of the signal supplied by the phase shifter will raise and lower the potentials at the apex terminals 61, 79 and 71 at the same time that the chroma is causing the secondaries of the transformers 87, 77 and 67 to vary the potentials of the anodes of the diodes 65, 85 and 75 with respect to the potentials of the apex terminals 61, 79 and 71. The synchronous demodulation signal, therefore, may be considered to flow around the perimeter of the delta in pulses and set up a back-bias across the decay networks 63, 83 and 73 so that approximately zero volts D.-C. is developed at the apex terminals 61, 79 and 71. The chroma signal adds to and subtracts from the synchronous detection signal to influence the conduction of each diode to cause each diode to sample the envelope of the chroma signal at a time corresponding to the desired color difference signal at one of the apexes, thereby unbalancing the circuit and causing proper phase and amplitude detections to appear at the resistance condenser circuits 59, 81 and 69 at the apexes. Because of the use of the delta structure, the amplitude of the synchronous demodulation signal need be only approximately twice as large as the amplitude of the chroma signal. The three color difference signals are produced at the input terminals 60, 70 and 80, respectively.

Should further filtering of the output color difference signals be necessary to remove any subcarrier information which may remain with the demodulated color difference signal, it is convenient to utilize an amplifier and trap of the type shown as the B–Y amplifier and trap 41. Here a trapping resonant circuit is used as a degeneration circuit in the B–Y amplifier so that zero or negligible gain is afforded for these high frequency components.

The diode delta demodulator 30 is also operable in another manner wherein the output of the burst sync oscillator 33 may be applied simultaneously to the primaries of each of the transformers 87, 77 and 67, with the chroma passed through suitable delay structure so that three proper phases of the chroma signal are then applied through the input terminals 60, 80 and 70.

Having described the invention, what is claimed is:

1. In a signalling circuit adapted to receive a modulated carrier, said modulated carrier containing a plurality of modulating signals, each of said modulating signals susceptible to demodulation by the processes of envelope sampling, each of said plurality of signals identified by predetermined timing of said envelope sampling, a delta demodulator circuit, comprising in combination, a first, second and third two-terminal transmission circuit having controllable transmission characteristics, said first, second and third transmission circuit connected serially in a delta arrangement with a terminal at each apex, means for causing a signal representative of said modulated carrier to flow in said first, second and third transmission circuits, means for cyclically controlling the magnitude and the timing of the transmission of said modulated carrier of each of said first, second and third transmission circuits and means to derive a prescribed one of said plurality of modulating signals at each apex terminal of said delta circuit.

2. In a signalling circuit adapted to receive a modulated carrier, said modulated carrier containing a plurality of modulating signals, each of said modulating signals susceptible to demodulation by the processes of synchronous detection, each of said plurality of signals identified by predetermined timing, a delta demodulator circuit, comprising in combination, a first, second and third synchronous detector path each consisting of a two-terminal path wherein an electron flow device capable of mixing electrical signals is serially connected, said first, second and third synchronous detector path connected in a delta arrangement, means for causing said modulated carrier to flow in each of said first, second and third synchronous detector paths and means for coupling a signal of prescribed timing into each of said first, second and third synchronous detector paths, and means to derive a prescribed one of said plurality of modulating signals appearing at each apex of said delta circuit from the mixing of said modulated carrier and said signal in each of said electron flow devices.

3. In a color television receiver, said color television receiver adapted to receive a color television signal, said color television signal characterized in that it contains a plurality of color difference signals, each of said plurality of color difference signals characterized by a predetermined phase and susceptible to the processes of synchronous detection, said color television signal also including a color synchronizing burst, said color synchronizing burst having a predetermined phase bearing prescribed relationship to the phases of each of said plurality of color difference signals, a delta demodulator for demodulating a predetermined trio of said plurality of color difference signals, comprising in combination, a first, second and third demodulator circuit, each of said first, second and third demodulator circuits having an electron flow device capable of mixing electrical signals and connected serially between an input terminal and an output terminal, said electron flow device a detection timing control terminal, means for coupling said input terminals of said first, second and third demodulator circuits to said output terminals of said second, third and first demodulators, respectively, to yield a delta demodulator circuit, means for causing an electrical signal representative of said color subcarrier to flow in each of said first, second and third demodulator circuits, a synchronous detection signal generator responsive to the phase of said color synchronizing burst, means to couple prescribed phases of synchronous detection signals to the detection timing control terminals of each of said first, second and third synchronous detectors, means to produce the first of said trio of color difference signals at the coupling of said output terminal of said first demodulator and the input terminal of said second demodulator, means to produce the second of said trio of color difference signals at the coupling of said output terminal of said second demodulator and the input terminal of said third demodulator, and means to produce the third of said trio of color difference signals at the coupling of said output terminal of said third demodulator and the input terminal of said first demodulator.

4. In a signalling circuit, said signalling circuit adapted to receive a modulated carrier, said modulated carrier containing a plurality of modulating signals, each of said modulating signals susceptible to demodulation by the processes of synchronous detection, a closed loop synchronous detector circuit, comprising in combination, a closed loop containing a plurality of synchronous detector devices in series, means for coupling a synchronous detection signal of prescribed phase to each of said plurality of synchronous detectors, means for coupling said modulated carrier to each of said plurality of synchronous detectors, means for balancing said closed loop synchronous detector circuit whereby zero volts D.-C. is developed at the mutual junction of each pair of said plurality of synchronous detection devices, means for deriving one of a predetermined number of said plurality of modulating signals at each of said mutual junctions of said pair of said synchronous detectors, each of said predetermined number of said plurality of modulating signals bearing a prescribed phase relationship to the phases of the synchronous detection signals applied to said synchronous detectors.

5. In a color television receiver, said color television receiver adapted to receive a color television signal, said color television signal characterized in that it includes a color subcarrier containing a plurality of color difference signals, each of said plurality of color difference signals characterized by a predetermined phase and susceptible to demodulation by synchronous detection, said color synchronizing burst having a predetermined phase bearing prescribed relationship to the phases of each of said plurality of color difference signals, said color television receiver also including a color synchronizing burst synchronized reference signal source including apparatus for yielding reference signals of various phases, a delta synchronous demodulator, comprising in combination, a first terminal, a second terminal and a third terminal, a first rectifier circuit, a second rectifier circuit and a third rectifier circuit, each of said first, second and third rectifier circuits including a rectifier in series with a decay network and a transformer device, said rectifier having at least an anode and a cathode, means to form a closed loop by coupling said first rectifier network between said first terminal and said second terminal said second rectifier network between said second terminal and said third terminal and said third rectifier network between said third terminal and said first terminal, the polarity of said rectifier in each of said rectifier circuits having a prescribed direction around said loop means for impressing said color subcarrier into each of said transformer devices of said first rectifier network, said second rectifier network and said third rectifier network, respectively, a first input circuit, a second input circuit and a third input circuit, each of said first, second and third input circuits including an electron storage capacity device, means for coupling a reference signal having a first predetermined phase through said first input circuit to said first terminal, means for coupling a reference signal having a second predetermined phase through said second input circuit to said second terminal, means for coupling said reference signal having said third predetermined phase through said third input circuit to said third terminal, means for adjusting said decay networks whereby said delta synchronous detector circuit is balanced so that substantially zero volts D.-C. are developed at said first terminal, said second terminal and said third terminal and whereby a color difference signal corresponding to said reference signal having said first predetermined phase is obtained from said first terminal, whereby a color difference signal corresponding to said reference signal having said second predetermined phase is obtained from said second terminal, and whereby a color difference signal corresponding to said reference signal having said third predetermined phase is obtained from said third terminal.

6. The invention as set forth in claim 5 and wherein there is included at said first terminal, said second terminal and said third terminal a filter device, each of said filter devices having a predetermined frequency pass band whereby a predetermined band of frequencies in the demodulated color difference signals is eliminated.

7. The invention as set forth in claim 5 and wherein each of said decay networks consists of a resistance and condenser in parallel.

8. The invention as set forth in claim 5 and wherein each of said input networks includes a series connected capacitor.

9. The invention as set forth in claim 5 and whereby each of said rectifiers have an anode and a cathode which are connected so that the anode of the rectifier in one rectifier circuit and the cathode of the rectifier in the adjacent rectifier circuit both face a common terminal.

10. In a color television receiver, said color television receiver adapted to receive a color television signal, said color television signal characterized in that it includes a color subcarrier containing a plurality of color difference signals, each of said plurality of color difference signals characterized by a predetermined phase and susceptible to demodulation by synchronous detection, said color synchronizing burst having a predetermined phase bearing prescribed relationship to the phases of each of said plurality of color difference signals, said color television receiver also including a color synchronizing burst synchronized reference signal source including apparatus for yielding a reference signal of a prescribed phase, a delta synchronous demodulator, comprising in combination, a first terminal, a second terminal and a third terminal, a first, second and third network rectifier, each of said first, second and third rectifier network including a rectifier polarized in a prescribed direction and in series with a resistance-condenser network and a transformer device, said rectifier having at least an anode and a cathode, means for coupling said first rectifier network between said first terminal and said second terminal, means for coupling said second rectifier network between said second terminal and said third terminal, means for coupling said third rectifier network between said third terminal and said first terminal, means for impressing said reference signal into each of said transformer devices of said first rectifier network, said second rectifier network and said third rectifier network, respectively, a first input and delay circuit, a second input and delay circuit and a third input and delay circuit, each of said first, second and third input and delay circuits including an electron storage capacity device and including time delay networks, means for coupling said color subcarrier with a first predetermined time delay through said first input and delay circuit to said first terminal, means for coupling said color subcarrier with a second predetermined time delay through said second input and delay circuit to said second terminal, means for coupling said color subcarrier with a third predetermined time delay through said third input and delay circuit to said third terminal, means for utilizing said resistance-condenser networks whereby said delta synchronous detector circuit is balanced so that substantially zero volts D.-C. are developed at said first terminal, said second terminal and said third terminal and whereby a color difference signal corresponding to said first predetermined time delay is obtained from said first terminal, whereby a color difference signal corresponding to said second predetermined time delay is obtained from said second terminal, and whereby a color difference signal corresponding to said third predetermined time delay is obtained from said third terminal.

11. The invention as set forth in claim 10 and wherein there is included at said first terminal, said second terminal and said third terminal a filter device, each of said filter devices having a predetermined frequency pass band whereby a predetermined band of frequencies in the demodulated color difference signals may be eliminated.

12. The invention as set forth in claim 10 and whereby said rectifiers are connected so that the anode of the rectifier in one rectifier network and the cathode of the rectifier in the adjacent rectifier network both face a common terminal.

13. In a color television receiver, said color television receiver adapted to receive a color television signal, said color television signal characterized in that it includes a color subcarrier including R–Y, B–Y, and G–Y color difference signals, each of said color difference signals characterized by a predetermined phase and susceptible to the processes of synchronous detection, said color synchronizing burst having a predetermined phase bearing prescribed relationship to the phases of each of said plurality of color difference signals, said color television receiver also including a color synchronizing burst synchronized reference signal source, said color synchronizing burst synchronized reference signal source including apparatus for yielding reference signals of various phases, a delta synchronous demodulator, comprising in combination, a first terminal, a second terminal and a third terminal, a first, second and third rectifier network, each of said first, second and third rectifier networks including a rectifier in series with a decay network and a transformer device, said rectifier having an anode and a cathode, means to form a closed loop by coupling said first rectifier network between said first terminal and said second terminal, said second rectifier network between said second terminal and said third terminal and said third rectifier network between said third terminal and said first terminal, means for impressing said color subcarrier into each of said transformer devices of said first rectifier network, said second rectifier network and said third rectifier network, respectively, a first input circuit, a second input circuit and a third input circuit, each of said first, second and third input circuits including an electron storage capacity device, means for coupling a reference signal having a first predetermined phase corresponding to said R–Y color difference signal through said first input circuit to said first terminal, means for coupling a reference signal having a second predetermined phase corresponding to said B–Y color difference signal through said second input circuit to said second terminal, means for coupling said reference signal having said third predetermined phase corresponding to said G–Y color difference signal through said third input circuit to said third terminal, means for deriving an R–Y color difference signal from said first terminal, a B–Y color difference signal from said second terminal, and a G–Y color difference signal from said third terminal.

14. In a signalling circuit adapted to receive a modulated carrier, said modulated carrier containing a plurality of modulating signals, each of said modulating signals corresponding to a phase and timing of said modulated carrier and capable of demodulation by synchronous demodulation, a demodulator circuit comprising in combination, a first, second and third electron stream device circuit, each circuit including an electron stream device having a first electrode providing a source of electrons and a second electrode constituting a collector of electrons; means to arrange said first, second and third electron stream device circuits as a delta circuit wherein the first electrode of each device is coupled to the second electrode of another device; means to introduce modulations representative of said modulated carrier into the electron stream of each device, means to introduce variations representative of synchronous demodulation signals corresponding to a selected phase of said modulated carrier into the electron streams of each of said devices, and means coupled to said device circuits to derive modulating signals having prescribed relationship to said selected phases of said modulated carrier from said device circuits.

15. In a signalling circuit adapted to receive a modulated carrier, said modulated carrier containing a plurality of modulating signals, each of said modulating signals corresponding to a phase and timing of said modulated carrier and capable of demodulation by synchronous demodulation, a demodulator circuit comprising in combination, a plurality of transmission paths connected serially to form a closed loop, each of said transmission paths including a heterodyning device, means to impress a voltage representative of said modulated carrier into each of said transmission paths, means to develop a demodulating signal, means to cause said demodulating signal to flow around said closed loop with a timing in each of said transmission paths, and means to derive modulating signals from the interaction of said modulated carrier and said demodulating signal from each heterodyning device corresponding to the timing of said demodulating signal with respect to said modulated carrier at each heterodyning device.

16. In a signalling circuit adapted to receive a modulated carrier, said modulated carrier containing a plurality of modulating signals, each of said modulating signals corresponding to a phase and timing of said modulated carrier and capable of demodulation by synchronous demodulation, a demodulator circuit comprising in combination, first, second and third transmission paths connected serially to form a closed delta path, each of said transmission paths including a device capable of mixing electrical signals, means to cause said modulated carrier to flow in each of said paths, means to produce a demodulating signal, means to cause selected phases of said demodulating signal to be mixed with said modulated carrier in each device, and means for deriving from each of said transmission paths modulating signals corresponding to said selected phases of said demodulating signal.

No references cited.